United States Patent [19]
Barefoot

[11] 3,957,655
[45] May 18, 1976

[54] SPHINCTER CONE ASSEMBLY FOR PURIFYING WATER

[76] Inventor: Bernard B. Barefoot, R.D. No. 3, Sunset Drive, Export, Pa. 15632

[22] Filed: Feb. 24, 1975

[21] Appl. No.: 552,776

Related U.S. Application Data

[63] Continuation-in-part of Ser. No. 411,344, Oct. 31, 1973, abandoned.

[52] U.S. Cl. .............................. 210/519; 210/535; 209/173; 209/491
[51] Int. Cl.² ........................................ B01D 12/00
[58] Field of Search ........... 210/201, 207, 220, 221, 210/262, 259, 322, 519, 535, 534, 533, 138, 143, 513; 209/173, 458, 459, 460, 488, 490, 494, 495, 502, 491

[56] References Cited
UNITED STATES PATENTS

| | | | |
|---|---|---|---|
| 1,065,542 | 6/1913 | Main.................................... | 210/519 |
| 3,291,569 | 12/1966 | Rossi.................................... | 210/262 |
| 3,616,925 | 11/1971 | Tolman................................ | 210/534 |
| 3,777,887 | 12/1973 | Johnston et al...................... | 210/490 |

*Primary Examiner*—Charles N. Hart
*Assistant Examiner*—Ernest G. Therkorn
*Attorney, Agent, or Firm*—William J. Ruano

[57] ABSTRACT

A sphincter cone for water treatment and clarification, which cone involves no moving parts. At the top of the cone there is provided a surge tank with an open bottom surrounded by an annular well extending along the perimeter of a cylindrical extension of the cone. The bottom of the well is tapered downwardly toward an outlet pipe. Water entering the top of the surge tank is distributed downwardly through the surge tank and radially outwardly into the annular well, while the particulate flows downwardly through the apex of the cone where it is formed into small compacted slugs and discharged. A second cone, in series, of similar construction may be used to further clarify the water.

2 Claims, 6 Drawing Figures

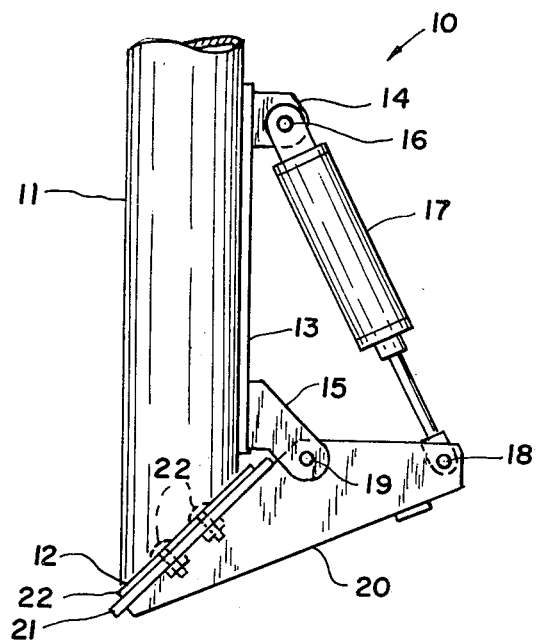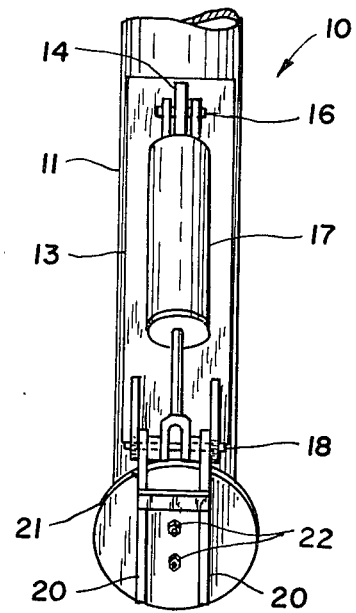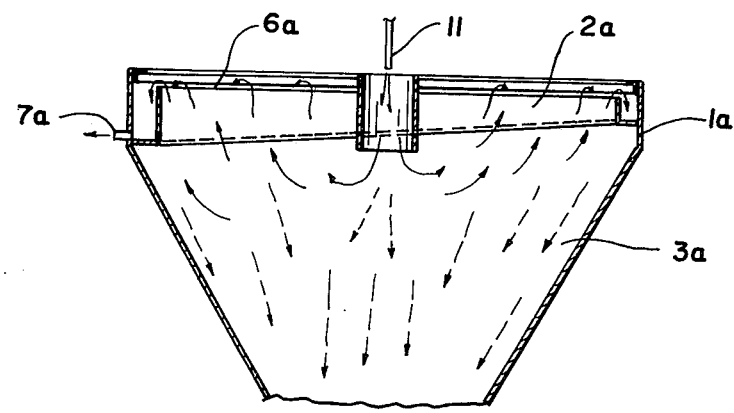

SPHINCTER CONE ASSEMBLY FOR PURIFYING WATER

This application is a continuation-in-part of Ser. No. 411,344, filed Oct. 31, 1973, and now abandoned.

This invention relates to a sphincter cone for the treatment and clarification of water.

An outstanding disadvantage of prior treatment and clarification apparatus for water is that they generally involve moving parts and are relatively complicated and expensive in construction, also they have shortcomings in treating and purifying water efficiently.

An object of my invention is to provide a novel treatment and clarification vessel in the form of a sphincter cone having no moving parts and overcoming the abovenamed disadvantages of prior apparatus.

A more specific object of the invention is to provide either a single sphincter cone or two or more in series, each of which cone being effective to treat water, as well as to purify it and form compacted slugs or pellets from the particulate which settles and collects in the apex of the cone or cones.

Other objects and advantages will become more apparent from a study of the following description, taken with the accompanying drawings wherein:

FIG. 3 is a fragmentary, cross-sectional view taken along line III—III of FIG. 2;

FIG. 4 is an elevational view and FIG. 5 is a side view of the sump valve 10 shown at the bottom of FIG. 2; and, FIG. 6 shows a timer circuit for the pinch and flap valves.

Figure 1:
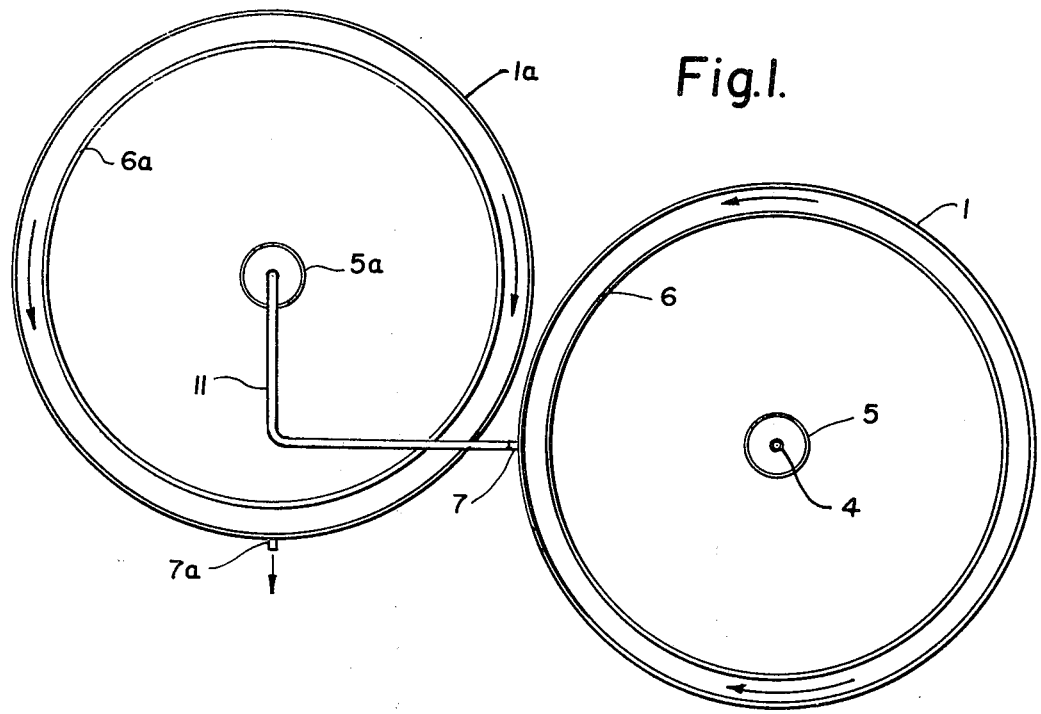
FIG. 1 is a top view and FIG. 2 is a side view of a pair of sphincter cones connected in series and embodying the principles of my invention.
Figure 2:
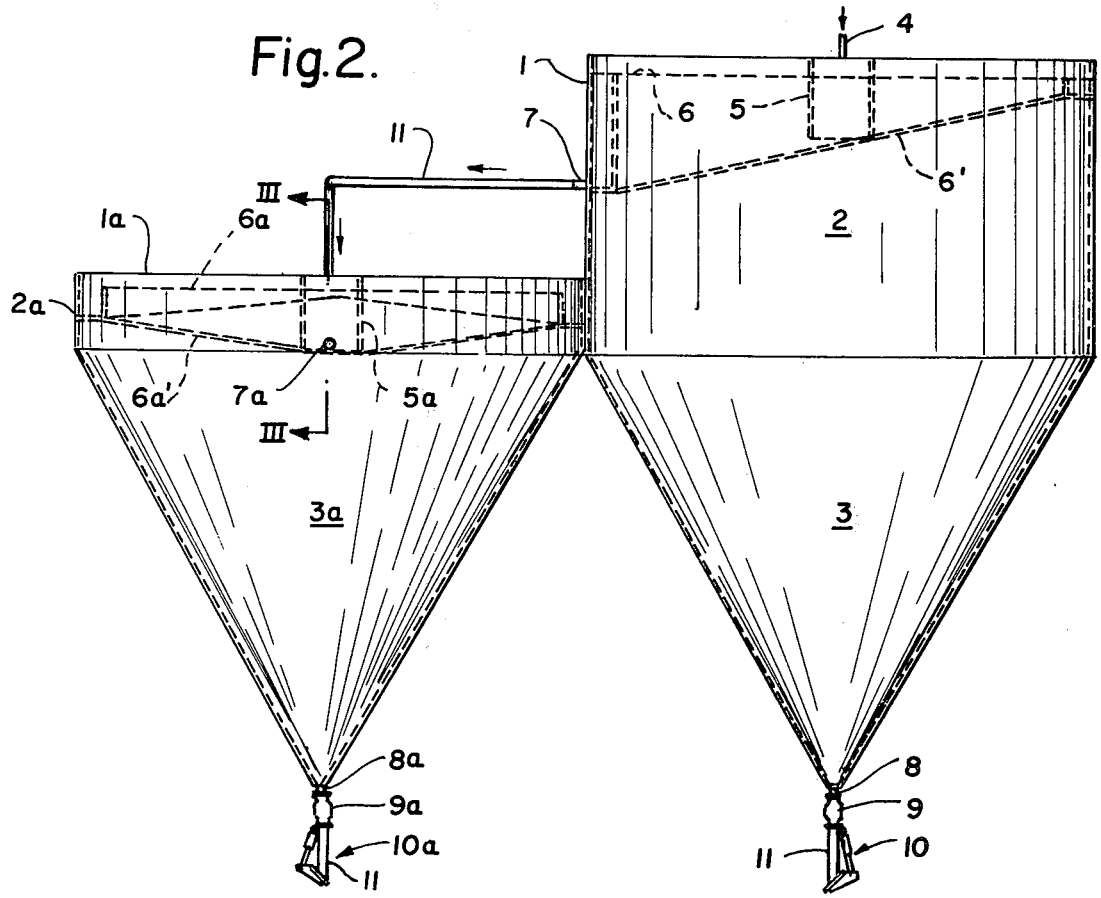

Referring more particularly to FIGS. 1, 2 and 3 of the drawing, numerals 2 and 3 generally denote the top and bottom portions, respectively, of a sphincter cone embodying the principles of the present invention.

The sphincter cone is a water treatment and clarification vessel which contains no moving parts. The return or recirculated water is introduced into the cone by pipe 4 through the surge tank 5 located at the top center of the cone and having an open bottom. The surge tank nullifies turbulence of the incoming water. From here the water is driven out of the bottom of the surge tank 5 (FIG. 3) and rises upwardly and radially outwardly from the center of the cone towards the outside circumferential sump formed between the inner circular wall 6 and outer wall 1. The bottom 6' of the circumferential sump is pitched or inclined downwardly toward the outlet pipe 7. This construction combined with the settling velocities of the descending suspended particulate directed towards outlet 8 serves to very adequately remove the solids from the water. The water is then drained in its clarified states away from the cone through outlet pipe 7 and is then ready for recirculation or return to sewage system or streams.

While the cone may be made of any suitable size, a practical size is one having a height and a diameter of 14 ½ ft. each, a 7500 gallon capacity with a 3 inch inlet pipe 4 flowing into a 24 inch surge tank 5, the sphincter cone shell having a 9 inch circumferential sump 6 with a 2 inch outlet 7 and a 7 inch particulate outlet 8. Of course, all these dimensions may be changed, as desired.

Should the water require more than simple clarification as provided in settling chambers, then the sphincter cone can serve as a water treatment vessel whereby the chemical additives are introduced upstream of the surge tank 5 and, through the turbulence in the surge tank, are thoroughly mixed and dispersed throughout the entire volume of water, thus resulting in uniform water treatment.

The collected particulate which has settled into the bottom of the cone at outlet 8 is then dropped through a series of valves (two in number namely, 9 and 10) into a collecting bucket or container (not shown) located immediately below the particulate discharge outlet of the cone. This valve arrangement consists of an outlet 8, normally open pinch valve 9 and a normally closed dump valve 10 as shown more clearly in FIGS. 4, and 5. On a timed basis, the pinch valve 9 closes and the dump valve 10 opens, thus discharging, in small compacted slugs, the collected particulates.

FIG. 3 shows the path of the water, illustrated by arrows in full line, and shows the path of the particulate shown by dotted arrows.

The dump valve 10 comprises a cylinder 11 through which the particulate is formed into compacted slugs or pellets and has a tapered outlet 12 which is closed by a rubber seal 22 which is bolted to a valve seat 21 formed on a rocker arm 20 pivoted at 19 to a bracket 15 mounted on a plate 13. A two-way pneumatically operated cylinder 17 with a piston therein has one end 16 connected to bracket 14 and the other end 18 connected to the rocker arm 20. The rubber seal clapper 22 gives positive shut-off against the head of water above the valve. Thus, when pinch valve 9 is closed, the dump valve 11 is opened by counterclockwise movement of rocker arm 20, and vice versa.

The pressure of the head of water above the valving arrangement compresses and dewaters the particulate such that the mass collected in the discharge bucket is of a fairly dry consistency and thus can be economically and easily transported to a sanitary landfill or other place of disposal, or can be processed through a pelletizer or bricking machine and recycled back into the original process.

FIGS. 1 and 2 show two sphincter cones 3 and 3a arranged in series providing primary and secondary clarification for heavy slurry operation. In this arrangement, the water initially comes into the primary sphincter cone 5 where the water is treated with chemicals as required to facilitate great reduction in the suspended particulate count. The slurry which overflows into the sump of the primary cone is drained through pipes 7 and 11 into the secondary cone 3a (see FIGS. 2 and 3) where final treatment will facilitate the proper degree of clarification in order for the clarified effluent to be drained through outlet pipe 7a to the sewers of streams or recycled back into the operation.

The construction of cone 3a is substantially the same as cone 3 and corresponding parts are identified by the same numerals with the addition of suffix "a", for example, surge tank 5a corresponds to tank 5 etc. The collected sludge is conveyed through pinch valve 9a and dump valve 10a into a sludge tank (not shown) for disposal or other use depending upon its chemical properties.

Of course, additional sphincter cones may be connected in series with the second cone 3a, if desired.

Thus it will be seen that I have provided a highly efficient sphincter cone assembly for treating and purifying water efficiently without moving parts, wherein the water is first directed through a surge tank and thence to a perimetrical well before discharging, while the particulate flows by gravity through the apex of the cone where it is formed into slugs or pellets which are discharged.

The upper valve 9 is a special pinch valve with rubber internals and air or hydraulic power used to close the valve, which is normally open, while the bottom flap valve 10 is normally closed during operation. During the dumping operation, automatically and on a timed basis or otherwise, the top pinch valve 9 is slowly closed by air or other force to a fully closed position. During this procedure, the solids that are collected in the pipe void between the top pinch valve 9 and the bottom flap valve 10 are slowly put under an additional hydraulic wringer type rolling pressure by the pinch valve which is applied to force out the water entrained within the solids, thereby affecting the solids dumped from the flap valve when opened to be fairly dry. The void distance or space relationship of the pinch valve to the flap valve is predetermined and allowed in the design of the dump valves by relating the quantity or volume of solids in the feed water to be clarified to the void or volume of solids in the feed water to be clarified to the void or volume between the pinch valve and the flap valve so that the pinch valve can function with a wringer roll effect.

During the dumping operation, the pinch valve automatically closes first, then shortly after the predetermined time delay the flap valve opens to discharge the collected solids. The flap valve then closes and subsequently the pinch valve is opened automatically on a predetermined basis. The entrained air trapped between the void of the flap valve and the pinch valve rises vertically and slowly through the cone to combine with any organic solids. These air bubbles are caught by the positioning of an inverted cone over the apex of the cone, the air bubbles then escape to the atmosphere without disturbing the settlement taking place in the cone or without causing turbulence within the vessel.

Figure 6:
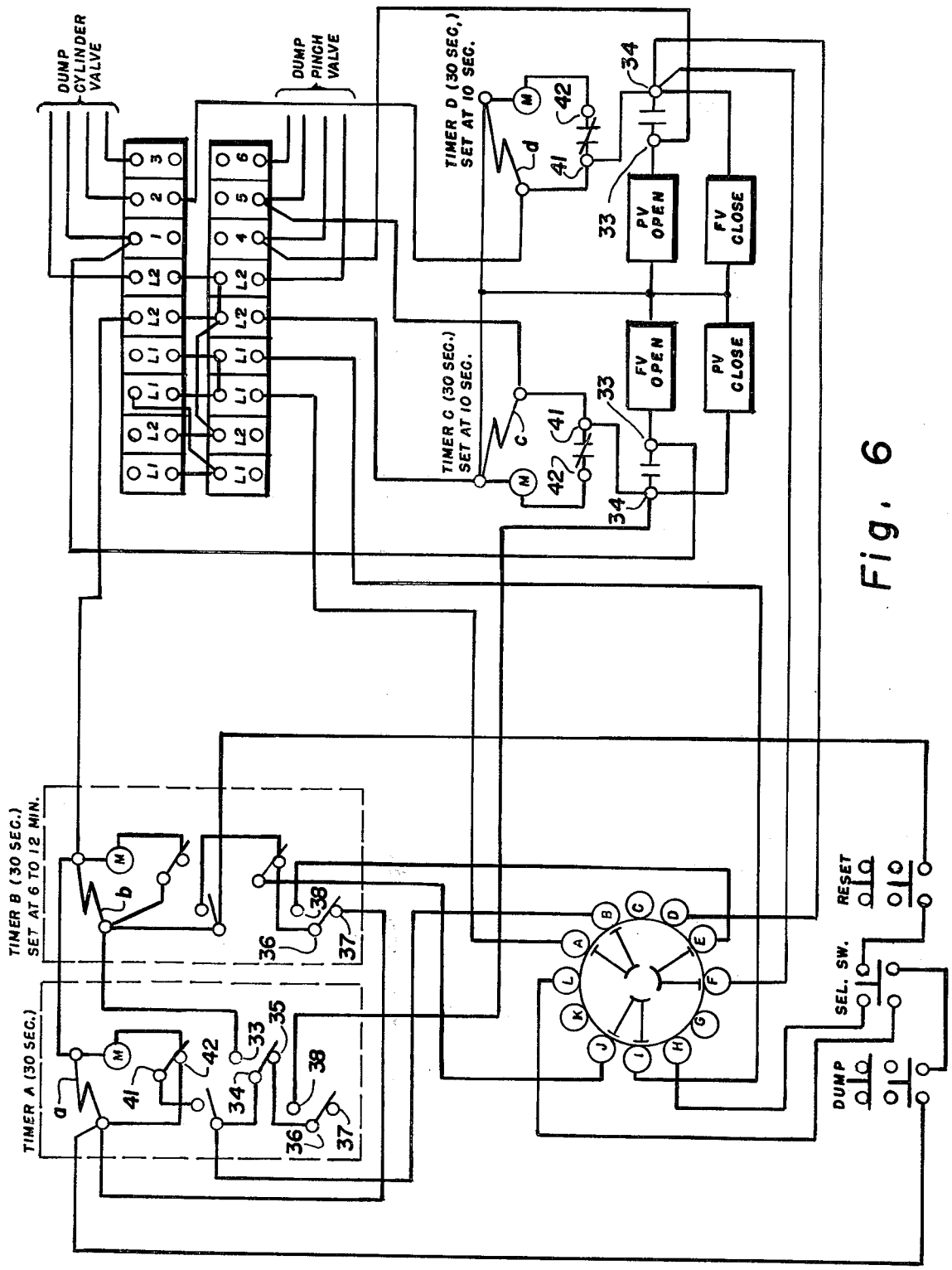

FIG. 6 shows a timing circuit for automatic operation of the pinch valve and flap valve. Coil "*a*" of Timer A (30 seconds) is energized by closed contacts 36, 37 on Timer B. At that time contacts 36 and 38 of Timer A close and coil "*c*" of Timer C (30 seconds) is energized and P.V.(pinch valve 9) closes and wrings out the water. 10 seconds later, contacts 34 and 33 on Timer C close and F.V. (flap valve 10) opens and the solids are dumped. After 30 seconds on Timer A, contacts 34 and 33 thereof close and energize coil "*b*" of Timer B and contacts 36 and 38 of Timer B close and energize coil "*c*" of Timer C and F.V. (flap valve 10). After 10 seconds on Timer D contacts 34 and 33 thereof close and P.V. (pinch valve 9) opens. After 6 to 12 minutes on Timer B, contacts 36 and 37 thereof close and energize coil "*a*" of Timer A and start the cycle over again. It should be understood that the pinch and flap valves may be operated manually instead to obtain the above timed relationship.

When I have illustrated and described several embodiments of my invention, it will be understood that these are by way of illustration only and that various changes and modifications may be contemplated in my invention and within the scope of the following claims.

I claim:

1. A sphincter cone for purifying water, comprising a cone shaped vessel having its apex lowermost and having a cylindrical extension extending upwardly thereof, a cylindrical surge tank with an open bottom formed centrally at the top of said extension, a cylindrical inner wall spaced inwardly from said cylindrical extension and a bottom wall between said inner wall and said cylindrical extension, which bottom wall is tapered downwardly throughout its perimeter towards a lower portion, to form a perimetrically extending annular well or sump into the top of which water will flow after flowing through the open bottom of said surge tank and over said cylindrical inner wall, an outlet pipe connected to said lower portion of said sump, a normally open pinch valve, with rubber internals, located below said apex and connected to the bottom of said vessel, a normally closed dump valve comprising a cylinder having a top end connected to said pinch valve and a valve element connected at the bottom end and in which cylinder sludges are formed beneath the apex of said cone, fluid operated means for slowly closing said pinch valve while said dump valve is closed so that solids collected in the void between said pinch valve and said dump valve are slowly put under an additional hydraulic wringer type rolling pressure by said pinch valve to force out the water entrained within the solids, and means for subsequently closing said pinch valve and opening said dump valve by opening the bottom of said cylinder, thus discharging small compacted relatively dry slugs, of the collected particulates.

2. A sphincter cone as recited in claim 1 together with automatic timing circuit means, including said last named means for slowly closing said pinch valve while said dump valve is closed and after a predetermined time period closing said dump valve and opening said pinch valve, and thereafter repeating the entire cycle.

* * * * *